Feb. 25, 1947.   J. W. MATHEY   2,416,488
JOINT AND METHOD OF FORMING THE SAME
Filed April 21, 1945
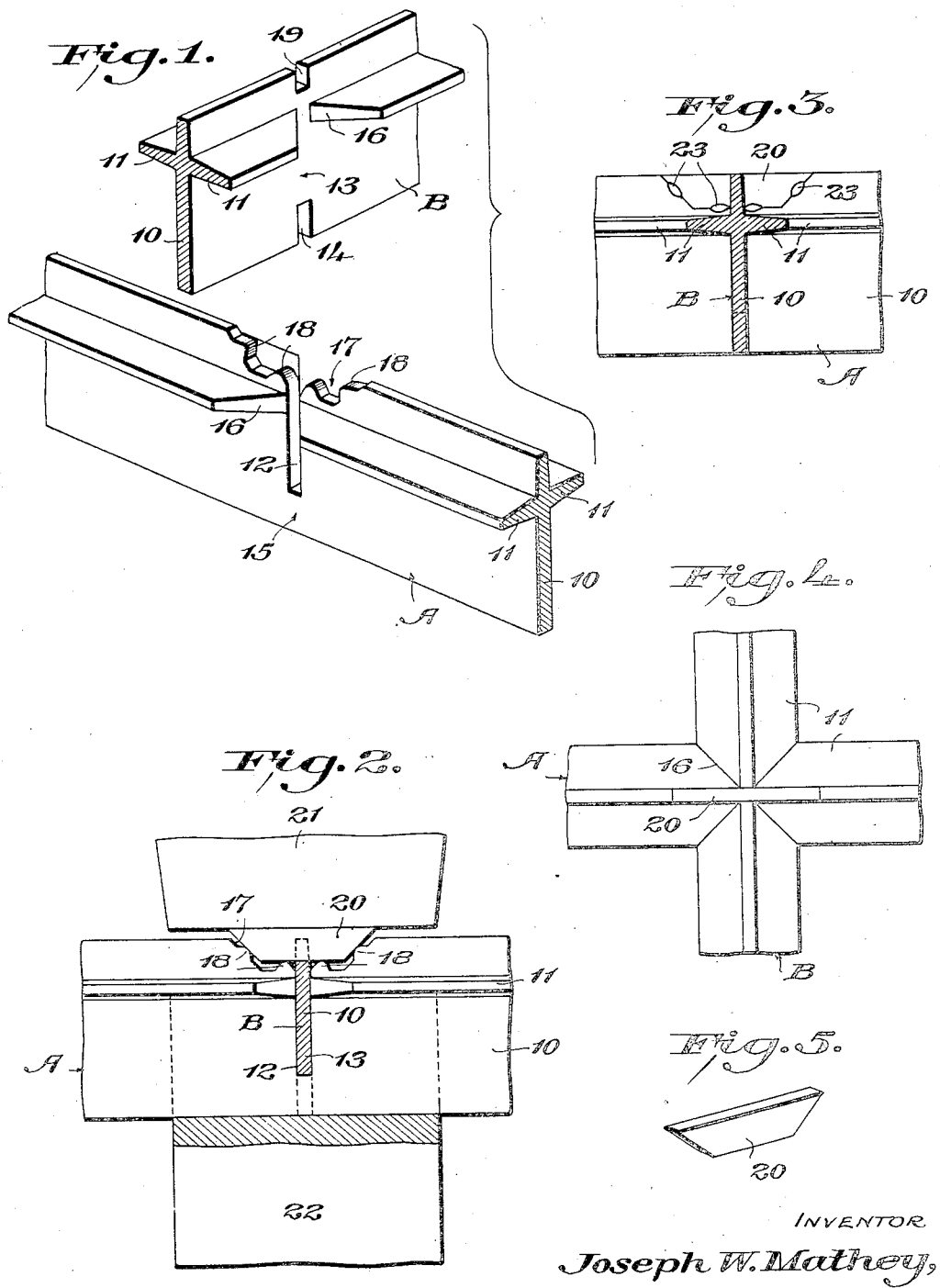
INVENTOR
Joseph W. Mathey,
BY
ATTORNEY Patented Feb. 25, 1947

2,416,488

UNITED STATES PATENT OFFICE 2,416,488

JOINT AND METHOD OF FORMING THE SAME

Joseph William Mathey, Youngstown, Ohio, assignor to Truscon Steel Company, Youngstown, Ohio, a corporation of Michigan Application April 21, 1945, Serial No. 589,629

4 Claims. (Cl. 287—51)

This invention relates to metal window sash and analogous structures comprising crossed muntin bars or their equivalents, and has generally in view to provide an improved joint between muntin bars or the like where they cross each other, and also to provide a novel method of forming said joint.

In forming window sash and analogous structures, it is common practice to notch, interfit and weld together the sash muntin bars or their equivalents at their points of crossing to provide joints therebetween. Heretofore, however, joints formed in this manner have not proved to be entirely satisfactory for the reasons that the bars are materially weakened by notching of the same and the joints have not served sufficiently to restore the strength thus lost to enable the bars satisfactorily to resist bending forces imposed thereon. For example, in the case of window sash formed in accordance with the aforesaid prior practice, the sash in many instances have not been satisfactorily resistant to bending or flexing under wind pressure and other forces imposed thereon in directions perpendicular to the planes thereof.

As is well known, it is primarily the metal adjacent to the edges of any web section which resists bending of the section in its plane. In the case of window sash muntin bars or their equivalents, it is this metal adjacent to the edges of the webs of the bars which usually is cut away to provide the notches to enable the bars to be interfitted in crossed relationship to each other, with consequent impairment of the strength of the bars to resist bending in their planes, while in accordance with prior practice, the portions of the bars to either side of the notches therein usually have not been rejoined in a manner to compensate fully for the strength lost due to the notching, with the consequent unsatisfactory results afore-mentioned. In this connection it is, of course, possible to regain the strength lost by the notching by welding the portions to either side of the notch in any given bar to the portion of the other bar which is disposed in the notch, but to do this in an effective manner involves complications and is impractical from an economical mass or quantity production standpoint by the use of known welding technique and practice.

Accordingly, one special and important object of the present invention is to provide a joint between muntin bars or their equivalents at their points of crossing which involves notching of the bars to enable them to be interfitted, yet which renders the resulting sash or like structure practically as strong at said joints as at other points, especially to resist bending forces imposed thereon in directions perpendicular thereto.

Another special and important object of the present invention is to provide a method of producing the present improved joint in a simple, practical and satisfactory manner from an economical mass or quantity production standpoint by the use of known welding technique and practice.

With the foregoing and other objects in view, which will become more fully apparent as the nature of the invention is better understood, the same consists in a joint embodying the novel features of construction, and in a method of producing the same involving the novel steps, as will be hereinafter more fully described, illustrated in the accompanying drawings and defined in the appended claims.

In the accompanying drawings, wherein like characters of reference denote corresponding parts in the different views:

Figure 1 is a perspective view illustrating portions of a pair of muntin bars disposed in separated relationship to each other and notched in accordance with the invention to adapt them to be interfitted and joined in crossed relationship to each other in accordance with the invention.

Figure 2 is a sectional view showing the bars interfitted and the manner of joining them in accordance with the invention.

Figure 3 is a sectional view showing the bars after they have been joined together in accordance with the invention.

Figure 4 is a plan view of the joined together bars; and

Figure 5 is a perspective view of a slug used in joining the bars together.

Referring to the drawings in detail, A designates one and B the other of a pair of window sash muntin bars of a well known type notched in accordance with the invention, said bars being duplicates of one another in cross section and each comprising a web 10 and a pair of alined flanges 11, 11 extending laterally therefrom intermediate its edges.

In accordance with the invention, the web 10 of the bar A has formed therein a notch 12 to accommodate a portion 13 of the web 10 of the bar B, and the web 10 of the bar B has formed therein a notch 14 to accommodate a portion 15 of the web 10 of the bar A.

The notch 12 opens through one edge of the web 10 of the bar A and the notch 14 opens through the opposite edge of the web 10 of the bar B. Each notch is of approximately the same width as the portion of the web of the other bar to be accommodated therein and said notches may be of equal or unequal depths. In any event, the web portions of the bars to be accommodated in said notches preferably are approximately coextensive in depth with said notches to adapt the bars to be brought into interfitted crossed relationship to each other and to occupy a common plane without being relatively movable beyond that plane. Moreover, the flanges 11, 11 are suitably cut away, as indicated at 16, to permit the said interfitting of said bars; the said cutting away of said flanges preferably being in a manner such that, when the bars are assembled in crossed relationship to each other, the flanges of the respective bars form, in effect, continuations of one another. Cutting away of the flanges to achieve this result obviously may be done in a variety of different manners.

Further in accordance with the invention, the notch 12 is provided with a widened mouth 17 which may be of any suitable length and depth and which preferably has inwardly inclined ends, while additionally in accordance with the invention the walls defining the bottom and the ends of said widened mouth are provided with suitable protuberances 18. Furthermore, in the edge portion of the web 10 of the bar B opposite the edge portion thereof through which the notch 14 opens, is formed a notch 19 to aline with the widened mouth 17 of the notch 12 when the bars are interfitted with each other.

A slug 20 of the same size and shape as the widened mouth 17 is provided and when the bars A and B have been interfitted with each other this slug is disposed in said mouth with its bottom and inclined ends resting upon the protuberances 18 and with its medial portion disposed in the notch 19, as shown in Figure 2 of the drawings. Suitable dies 21 and 22 then are utilized to apply pressure to the slug 20 to urge it into the mouth 17 and, at the same time, the bars A and B and said slug are included in an electric resistance welding circuit to effect welding of said slug in said mouth. In this connection, passage of the current between the slug 20 and the bars is localized at the protuberances 18 with the result that the welding is rapid and insures firm uniting of both end portions of said slug with the related portions of the web 10 of the bar A at the locations of the protuberances 18, as indicated at 23 in Figure 3 of the drawings. The net result is that the slug 20 fills the mouth 17 and restores, in effect, the metal removed by the forming of said mouth, so that bar A is practically as strong and resistant to bending in its plane as it was before it was notched to permit assembly of the bars. Welding may also occur between the medial bottom portion of the slug 20 and the web 10 of the bar B and between other contacting portions of said bars, but this is immaterial so far as the invention is concerned because restoring the notched bar A by means of the slug 20 to practically its original strength to resist bending thereof in its plane insures accomplishment of the ultimate purpose of the invention previously set forth.

Obviously, so far as the present invention is concerned, it is immaterial whether the bars A and B are window sash muntin bars or other bars and whether said bars do or do not have flanges such as the flanges 11. In short, within the purview of the invention the bars A and B obviously may be of various different cross sectional shapes. Obviously, too, the present joint may be produced rapidly, economically and without complications by following the simple notching, interfitting and welding steps set forth.

Without further description it is thought that the features and advantages of the invention will be readily apparent to those skilled in the art, and it will, of course, be understood that changes in the form, proportion, and minor details of construction may be resorted to, without departing from the spirit of the invention and scope of the appended claims.

I claim:

1. A pair of metal bars disposed in crossed relationship to each other, each bar having therein a notch extending from one edge thereof inwardly a limited distance and accommodating a portion of the other bar, the mouth portion of the notch in at least one of said bars being wider than the portion of the other bar which it accommodates, the portion of the other bar which is accommodated in said mouth portion having therein a notch which is alined with said mouth portion, and a filler slug disposed in said mouth portion and in the alined notch of the other bar and welded to the bar having said mouth portion.

2. A pair of metal bars disposed in crossed relationship to each other, each bar having therein a notch extending from one edge thereof inwardly a limited distance and accommodating a portion of the other bar, the mouth portion of the notch in at least one of said bars being wider than the portion of the other bar which it accommodates, the portion of the other bar which is accommodated in said mouth portion having therein a notch which is aligned with said mouth portion, and a filler slug disposed in said mouth portion and in the alined notch of the other bar and welded to both of said bars.

3. A pair of metal bars disposed in crossed relationship to each other, each bar having therein a notch extending from one edge thereof inwardly a limited distance and accommodating a portion of the other bar, the mouth portion of the notch in at least one of said bars being wider than the portion of the other bar which it accommodates and having inwardly converging ends, the portion of the other bar which is accommodated in said mouth portion having therein a notch which is alined with said mouth portion, and a filler slug substantially conforming in size and shape to and disposed in said mouth portion and in the alined notch of the other bar and welded to the bar having said mouth portion.

4. A pair of metal bars disposed in crossed relationship to each other, each bar having therein a notch extending from one edge thereof inwardly a limited distance and accommodating a portion of the other bar, the mouth portion of the notch in at least one of said bars being wider than the portion of the other bar which it accommodates and having inwardly converging ends, the portion of the other bar which is accommodated in said mouth portion having therein a notch which is alined with said mouth portion, and a filler slug substantially conforming in size and shape to and disposed in said mouth portion and in the alined notch of the other bar and welded to both of said bars.

JOSEPH WILLIAM MATHEY.

REFERENCES CITED

The following references are of record in the file of this patent:

UNITED STATES PATENTS

| Number | Name | Date |
| --- | --- | --- |
| 2,043,207 | Bayley | June 2, 1936 |
| 1,301,981 | Smith | Apr. 29, 1919 |
| 1,308,428 | Lachman | July 1, 1919 |
| 1,872,394 | Bleicher | Aug. 16, 1932 |
| 2,241,871 | Tench | May 13, 1941 |